United States Patent
Baic et al.

(10) Patent No.: US 9,617,767 B1
(45) Date of Patent: Apr. 11, 2017

(54) LATCH MECHANISM

(71) Applicant: Avibank Manufacturing, Inc., North Hollywood, CA (US)

(72) Inventors: Zeljko Baic, Sylmar, CA (US); Ubaldo Medina, North Hollywood, CA (US)

(*) Notice: Subject to any disclaimer, the term of this patent is extended or adjusted under 35 U.S.C. 154(b) by 0 days.

(21) Appl. No.: 14/935,189

(22) Filed: Nov. 6, 2015

Related U.S. Application Data

(60) Provisional application No. 62/076,010, filed on Nov. 6, 2014.

(51) Int. Cl.
*E05C 19/14* (2006.01)
*E05C 3/16* (2006.01)
*B64C 1/14* (2006.01)

(52) U.S. Cl.
CPC .............. *E05C 19/145* (2013.01); *B64C 1/14* (2013.01); *E05C 3/162* (2013.01)

(58) Field of Classification Search
CPC .. E05B 15/0086; E05B 57/00; E05B 65/0811; E05B 65/0817; E05C 5/00; E05C 2005/005; E05C 19/10; E05C 19/12; E05C 19/145; E05C 19/14; E05C 3/162; B64C 1/14
USPC .................................. 292/256, 256.5, 256.69
See application file for complete search history.

(56) References Cited

U.S. PATENT DOCUMENTS

| | | | | |
|---|---|---|---|---|
| 4,053,177 A * | 10/1977 | Stammreich | .......... | E05C 19/145 292/113 |
| 5,152,559 A * | 10/1992 | Henrichs | ................ | B64D 29/06 292/113 |
| 5,620,212 A * | 4/1997 | Bourne | .................. | B64D 29/06 292/113 |
| 5,984,382 A * | 11/1999 | Bourne | .................. | B64D 29/06 292/113 |
| 6,325,428 B1 * | 12/2001 | Do | .......... | B64D 29/06 244/129.4 |
| 7,461,871 B2 * | 12/2008 | Vauchel | ................ | E05C 19/145 292/113 |
| 8,573,934 B2 * | 11/2013 | Soulier | .................. | B64D 29/06 244/129.4 |
| 9,273,488 B1 * | 3/2016 | Yu | .......... | E05B 15/025 |
| 2008/0129056 A1 * | 6/2008 | Hernandez | ............ | E05B 63/143 292/98 |
| 2011/0113837 A1 * | 5/2011 | Soulier | .................. | B64D 29/06 70/237 |
| 2015/0259957 A1 * | 9/2015 | Hernandez | ............ | E05C 19/145 292/97 |

* cited by examiner

*Primary Examiner* — Andrew Roersma
(74) *Attorney, Agent, or Firm* — R. Scott Kimsey, Esq.; Klein DeNatale Goldner

(57) ABSTRACT

An aircraft latch mechanism has a latch body having a front end and a rear end and a longitudinal slot extending along a portion of the length of the body. A pair of first cam members flanks the latch body. A handle is pivotally attached to the first cam members. The first cam members are also attached to a pair of over-center links. A mounting bushing extends through the longitudinal slot at the pivot where the first cam members and over-center links attach. Movement of the handle causes a corresponding movement of the first cam members, over-center links, and the connecting structure extending through the slot.

7 Claims, 16 Drawing Sheets

LATCH MECHANISM

RELATED APPLICATIONS

The present application claims priority of U.S. Provisional Patent Application No. 62/076,010, filed Nov. 6, 2014 and entitled "Latch Mechanism," which application is incorporated herein by reference in its entirety.

BACKGROUND

1. Field

This invention is related to latches, and more particularly, to aircraft latches.

2. Background

Latches are used on the exterior surfaces of aircraft where it is important that the latch present a flush surface with the aircraft body and indicate when the latch is in a locked or unlocked position. Such latches normally cooperate with a keeper or locking pin on an opposing surface for engaging the latch. It is important that such latches be securely and tightly latched, especially when subjected to high vibrations and rattling. This is particularly true when the latch must draw together larger structures over long distances, and the latch is subjected to higher loads.

SUMMARY

The disclosed latch mechanism provides an aircraft latch that has the capability of drawing together larger structures over relatively long distances, securely closing and locking so the aircraft latch cannot be opened accidentally during service or the like, and that meets the requirements for high-loading, spatial limitations and meets kinematic requirements.

One aspect of the latch mechanism provides a latch body having a front end and a rear end and a longitudinal slot extending along a portion of the length thereof. A pair of first cam members flanks the latch body and a handle is pivotally attached to the first end of each of the first cam members. The second ends of the first cam members are pivotally attached to the first ends of a pair of rear over-center links. A mounting bushing extends through the longitudinal slot at the pivot where the rear over-center links and first cam members connect. Front over-center links are pivotally connected to a second end of the rear over-center links, and are also pivotally attached to the latch body at a front end thereof. Movement of the handle causes a corresponding movement of the first cam members, both pairs of over-center links, and the connecting structure extending through the longitudinal slot of the latch body, thereby allowing the latch mechanism to be moved from the opened to closed position and vice versa.

Another aspect of the invention provides a pair of toggle links having first and second ends. The first end of each toggle link is pivotally attached to the second end of a respective first cam member. A pair of second cam members are provided, the first end of each second cam member pivotally attached to the second end of a respective toggle link. A pair of cam links are provided, the first end of each cam link pivotally attached to a respective second end of a second cam member and the second end of each cam link pivotally attached to the latch body.

Another aspect of the invention provides a second cam member having first and second ends. The first end of the second cam member is pivotally attached to the latch body, and the second end of the second cam member defines a sloped perimeter. A roller is rotatably attached to the first pair of cam members. When the latch mechanism is moved from the open position to the closed position, the roller travels along at least a portion of the perimeter of the second cam member, forcing the second cam member toward the latch body.

Another aspect of the invention provides a locking mechanism for retaining the latch mechanism in a closed position.

Another aspect of the invention includes a release to disengage the locking mechanism to allow the latch mechanism to return to the open position from the closed position.

Another aspect of the invention provides a clevis attached to the handle at a first end thereof, the clevis rotatably attached to each of the cams of the first pair of cam members and disposed between the two cams of the first pair of cam members.

Another aspect of the invention provides a toggle link having a first end rotatably attached to the first cam member and a second end rotatably attached to the second cam member. The toggle link defines a perimeter edge therearound. A pin is attached to at least one of the cams of the first pair of cam members at a position distal to that of the roller. When the latch mechanism transitions from the open position to the closed position, the pin travels along at least a portion of the toggle link, pushing the latch mechanism into the closed position.

DETAILED DESCRIPTION

Figure 1:
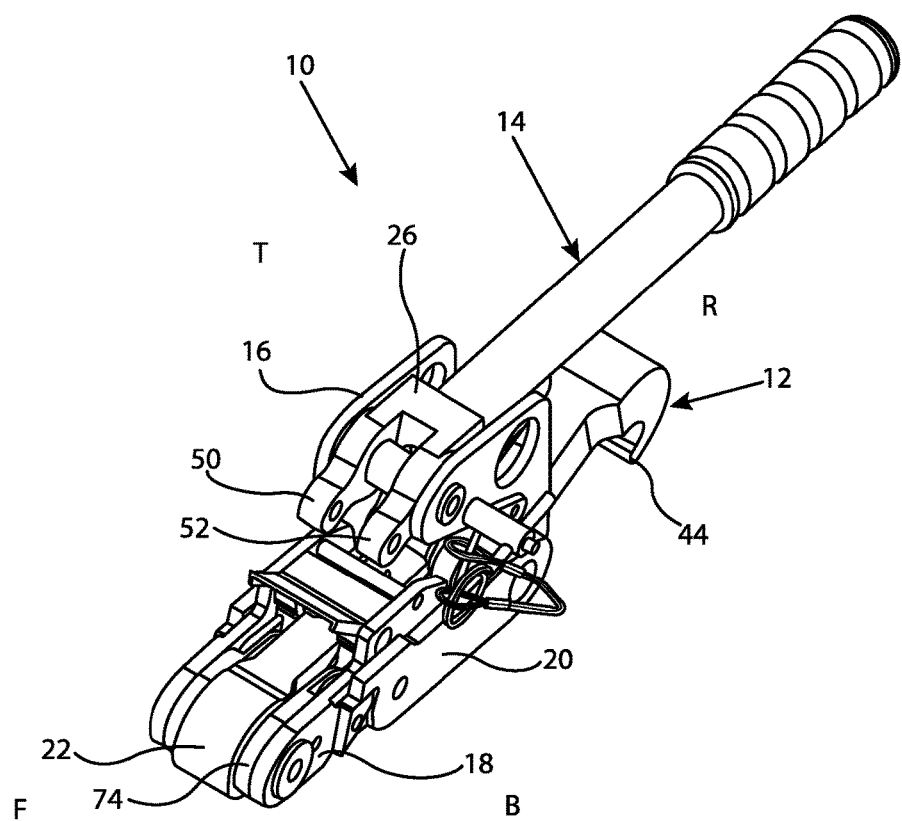
FIG. 1 is a perspective view of an embodiment of the disclosed latch mechanism shown in the closed position.

Referring now to the Figures, wherein like numerals indicate like parts, an embodiment of the disclosed latch mechanism is depicted, in perspective view, in FIG. 1. The latch mechanism 10 generally includes two components, a latch assembly 12 and a handle 14 for manipulation of latch assembly 12. Latch assembly 12 includes a pair of first cam members 16, rear pair of over-center links 20, a front pair of over-center links 18, a latch body 22, a pair of second cam members 24, and a pair of toggle links 32. In many of the figures provided herein, only one of the pair of rear and front over-center links, or of the first and second cam member pairs, or of various other paired components of the present device, is visible. It is to be understood that both pieces that make up the pair of each of these components are preferably identical in shape and function and are located on opposing sides of the device.

Figure 2:
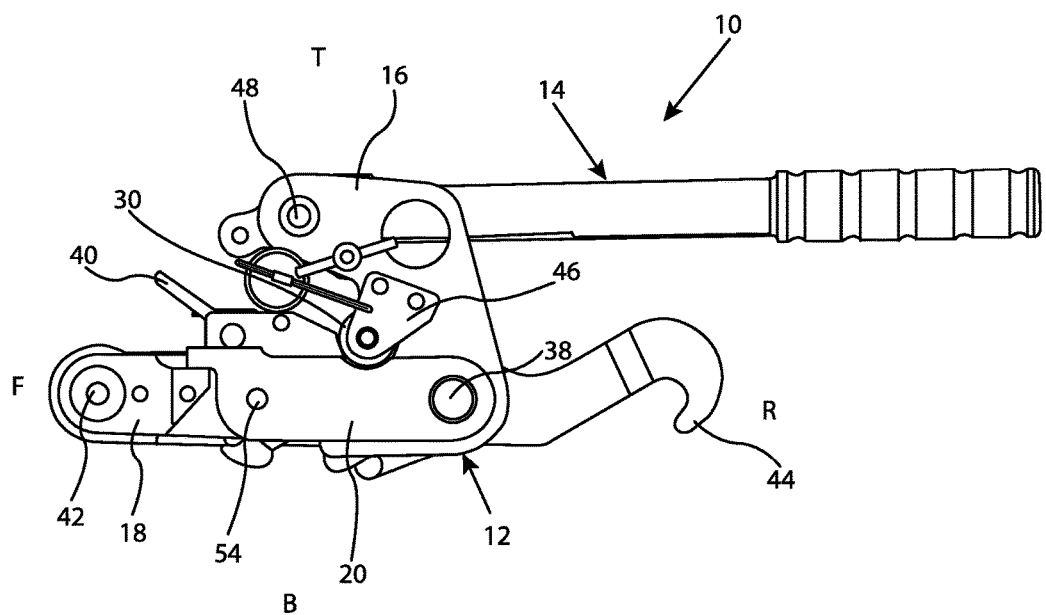
FIG. 2 is a side view of the embodiment of the disclosed latch mechanism shown in FIG. 1.

FIG. 2 indicates various directions that may be used in describing latch mechanism 10, using the following directional indicators: the front of latch mechanism 10 is indicated as F, the rear is indicated as R, the top is indicated as T, and the bottom is indicated as B. It is to be understood, however, that the latch mechanism 10 is operational in any relative position and the above designations are provided for reference purposes only.

As can be seen, for example, in both FIGS. 1 and 2, handle 14 is attached to a clevis 26, which is in turn attached to latch mechanism 10 via a pair of first cam members 16. Clevis 26 of handle 14 is pivotally attached to the first cam members 16 and contained therebetween. Clevis 26 is attached to first cam members 16 via handle rivet 48, and portions of clevis 26 extend beyond handle rivet 48 in a forked configuration, with prongs 50 and 52 of clevis 26 extending beyond the confines of first cam members 16. First prong 50 and second prong 52 may include a cylindrical or other support structure disposed therebetween. First cam members 16 are attached to rear over-center links 20 by mounting bushing 38. In addition, clevis 26 is pivotally attached to the upper end of cam members 16 via handle rivet 48.

The first cam members 16 may be configured to form a pair of opposing, supporting structures for a roller, such as roller support plates 46. In some embodiments of the present latching mechanism, these supporting structures may be portions of the first cam members 16 and integrally formed therewith. In other embodiments of the present latching mechanism, separate roller support plates 46 may be affixed to first cam members 16 in any suitable manner. A roller 30 or similar structure is disposed between the two roller support plates 46. At the end of first cam members 16 opposing the end at which handle 14 is attached to handle rivet 48, first cam members 16 pivotally engage rear over-center links 20. The first cam members 16 and over-center links 20 are pivotally attached via mounting bushing 38, though it is contemplated that a rivet, bolt, or other fastener may be used that extends between the coupled pairs of first cam members 16 and rear over-center links 20. The body of the mounting bushing 38 extends through a longitudinal slot 36 in the latch body 22, as best shown in FIG. 7.

Figure 10:
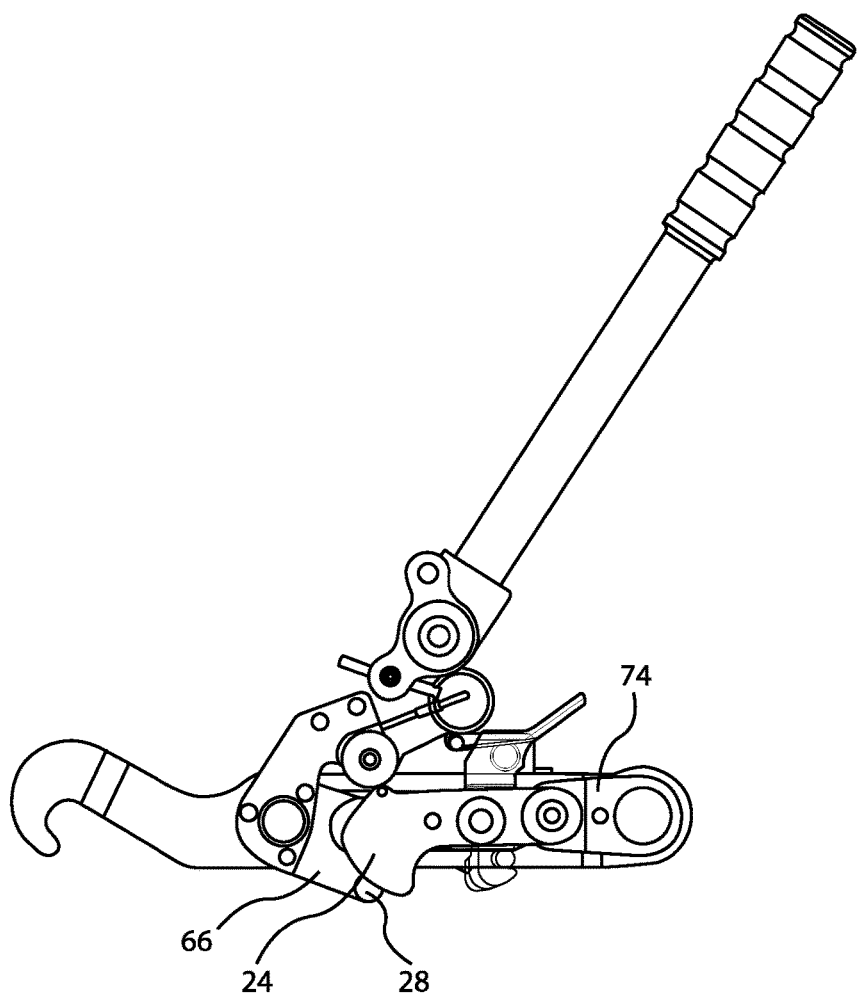
FIG. 10 is a side view of an embodiment of the disclosed latching mechanism showing certain internal components thereof.

To the interior of the first pair of cam members 16 are a pair of first cam links 66 shown, for example, in FIG. 10. First cam links 66 are preferably mounted on mounting bushing 38 and may also be attached to first cam members 16 by rivets or other fasteners. In some embodiments of the present latch mechanism, first cam links 66 may be integrally formed with first cam members 16. At the second end of each of first cam links 66, latch release pins 28 may be provided. Each latch release pin 28 extends outwardly from the respective cam link 66, and functions in opening latching mechanism 10 as described below.

Rear over-center links 20 are pivotally attached to front over-center links 18 at second over-center link pivot 54. The opposing end of front over-center links 18 from those ends attached to rear over-center links 20 are pivotally attached to latch body 22 at third over-center link pivot 42. Also attached at this pivot point are first ends of second cam links 74, which, at a second end thereof, pivotally engage second cam members 24. Second cam members 74 may be integrally formed with front over-center links 18 in some embodiments of the disclosed latch. Latch body 22 is contained between the joined pairs of front over-center links 18 and second cam links 74. The portion of latch body 22 attached to the joined second over-center links and second cam links 74 is at or near the front of the device, as shown, for example, in FIG. 1. Latch body 22 extends away from third over-center link pivot 42, running between the over-center links and extending from the rear of latch mechanism 10. Second cam members 24 include second ends, which form the head 58 of each of the pair of second cam members 24 and function as described in greater detail below.

Figure 7:
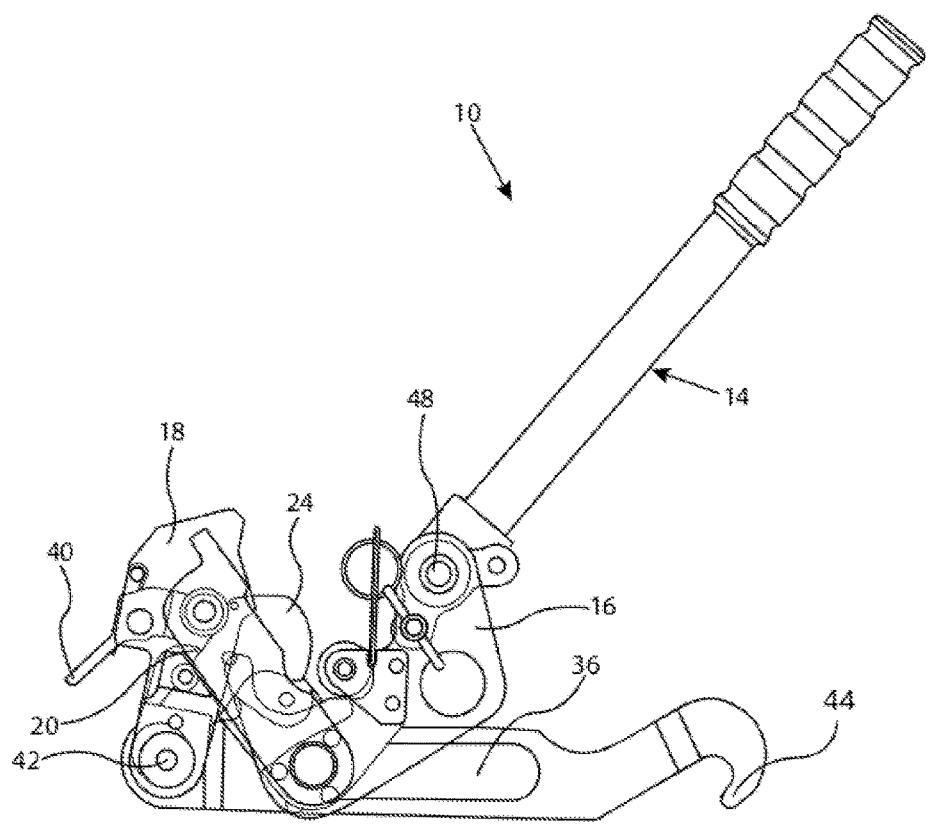
FIG. 7 is the view provided in FIG. 6, with certain elements shown as transparent so that the interior details of the latch mechanism are visible.

Latch body 22 includes a longitudinal slot 36, best shown in FIG. 7, that extends along at least a portion of the length of the latch body 22. Latch body 22 also terminates in a hook 44 at its rearmost end. Mounting bushing 38 extends through longitudinal slot 36, allowing the rivet, bolt, or other structure that joins various components of latch mechanism 10 at first over-center link pivot 38 to move along a longitudinal axis of latch body 22.

Figure 3:
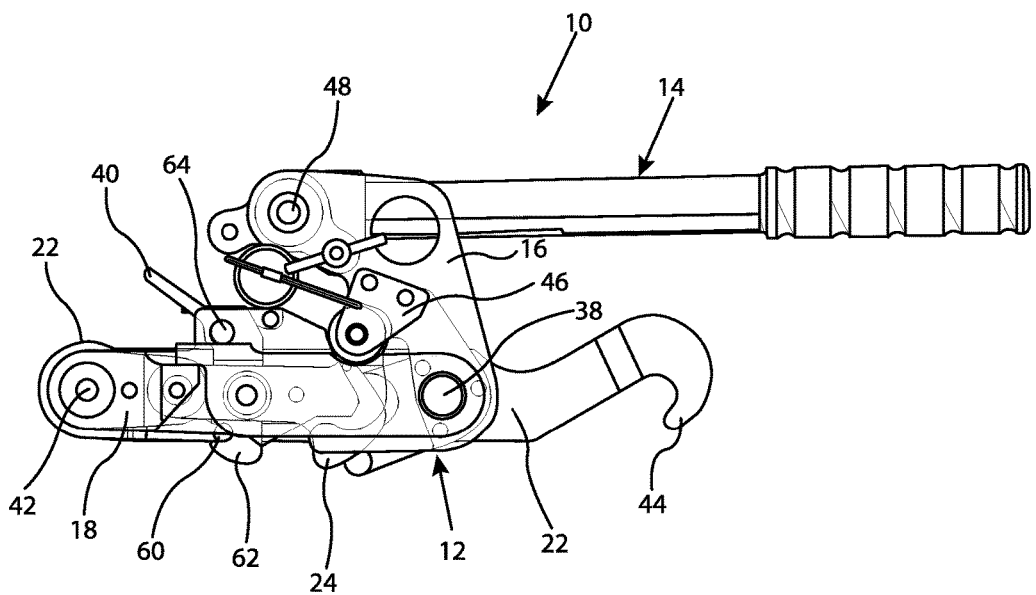
FIG. 3 is a side view of the embodiment of the disclosed latch mechanism shown in FIG. 1, with certain elements shown as transparent so that interior details of the latch mechanism are visible.

FIG. 3 is a side view of latch mechanism 10 in a closed configuration, with many of the components of latch mechanism 10 shown as transparent so that other structures of latch mechanism 10 may be seen. For example, the structure of one of second cam members 24 is visible, extending from a first end of second cam member 24 pivotally attached to latch mechanism 10 at second over-center link pivot 42 to a second portion of cam 24 at an opposing end that forms the head 58 thereof. Latch trigger 40 is also visible, as is lock pivot 64, and lock 62, the latter of which engages locking boss 60 to securely lock latch mechanism 10 when latch mechanism 10 is in the closed position.

Figure 8:
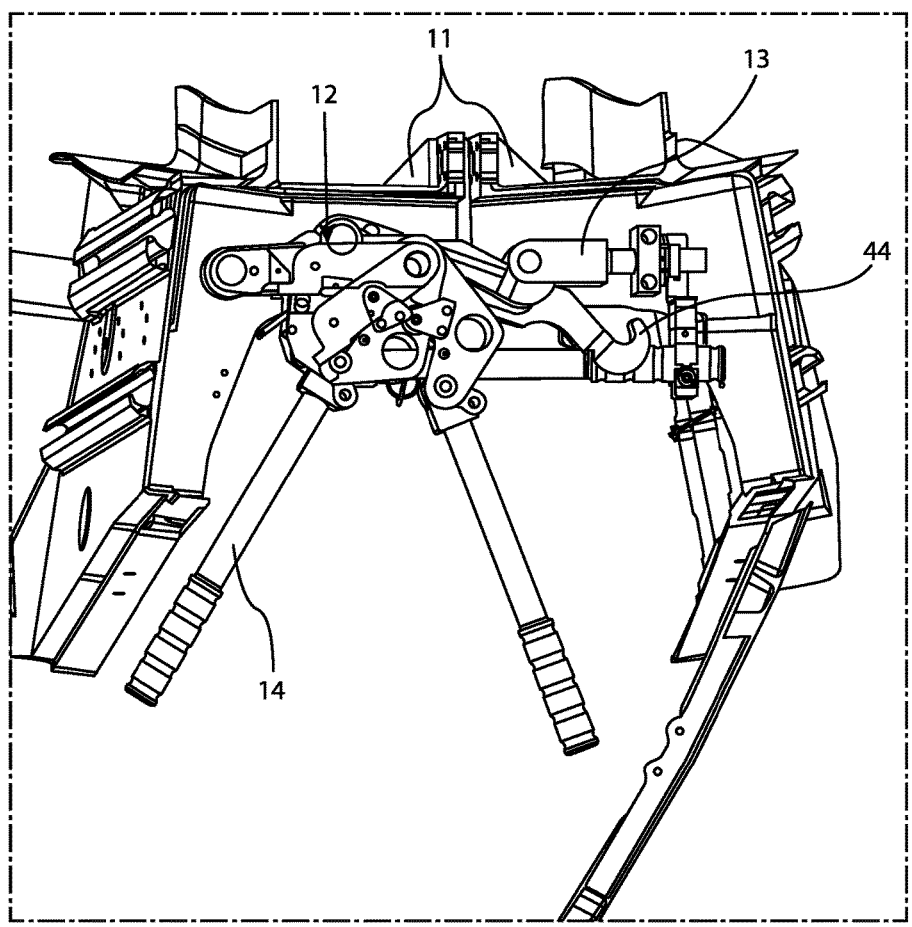
FIG. 8 is a side view of an embodiment of the disclosed latch mechanism, the latch mechanism associated with aircraft components, showing the range of motion of the handle thereof.

FIG. 8 shows latch mechanism 10 associated with a pair of aircraft components 11 to be held closed by latch mechanism 10. The figure shows the range of motion of latch mechanism 10, and the travel of both latch assembly 12 and handle 14 when latch mechanism 10 moves between the open and closed positions. As can be seen from the figure, aircraft components 11 include a keeper 13 that engages hook 44 of latch body 22.

Figure 9:
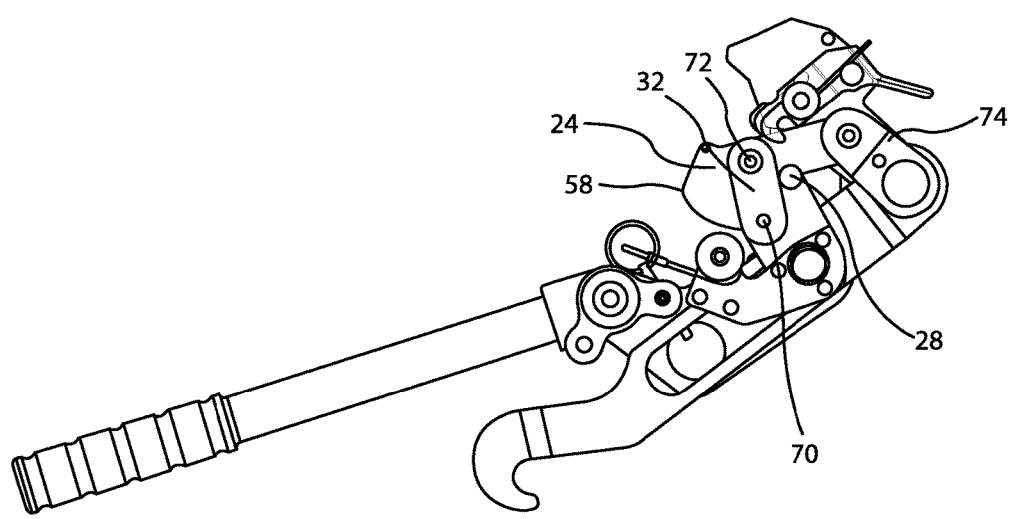
FIG. 9 is a side view of an embodiment of the disclosed latching mechanism showing certain internal components thereof.

FIG. 9, among other views, depicts one of toggle links 32. As with other components of the present latching mechanism 10, a second toggle link 32 of the same size and shape it located on the opposing side of latching mechanism 10. Toggle links 32 are pivotally attached, by rivet 70 at first ends thereof, to first cam links 66 at a point along first cam links 66 between the openings for roller shaft 68 and latch release pins 28. Toggle links 32 are attached at a second end thereof to second cam members 24 by rivet 72, as shown in the figures. In FIG. 9, latch mechanism 10 is shown in an open configuration. When in a closed configuration, toggle links 32 are in axial alignment with rear over-center links 20.

Operation of latch mechanism 10 is now described with reference to the various figures. FIGS. 1 through 3 depict latch mechanism 10 in a closed and locked position. Front over-center link 18 and rear over-center link 20 are in axial alignment, and handle 14 is in a stowed position substantially parallel to the aligned over-center links. In use, the mounting bushing 38 of the latch would be affixed to a first aircraft component, and hook 44 would be engaged with a keeper associated with a second aircraft component. With latch mechanism 10 in the locked configuration shown, with mounting bushing 38 pulled toward the rear of latch mechanism 10, the two aircraft components are held firmly together.

Figure 4:
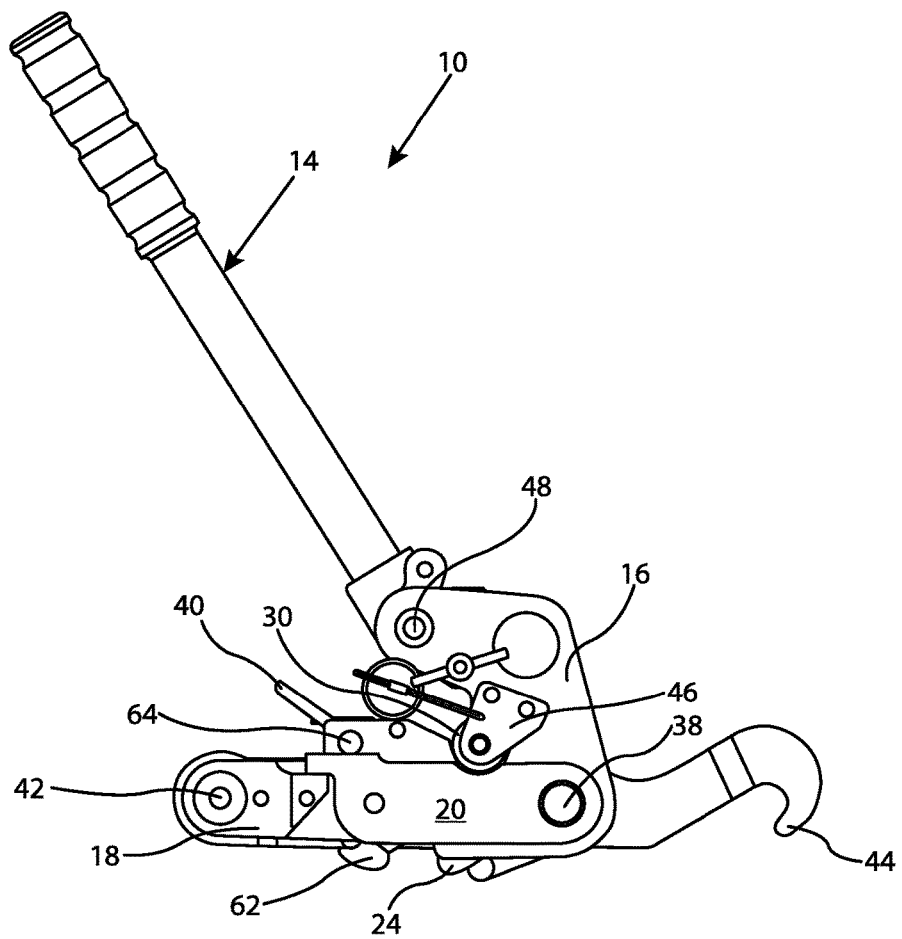
FIG. 4 is a perspective view of the embodiment of the disclosed latch mechanism shown in FIG. 1, with the handle shown in the open position while the latch remains closed.

FIG. 4 shows latch mechanism 10 in a closed position, however handle 14 is no longer in stowed position, but instead is in a deployed position, ready for use in opening latch mechanism 10. Handle 14 pivots around handle rivet 48, where handle 14 engages first cam members 16.

Figure 5:
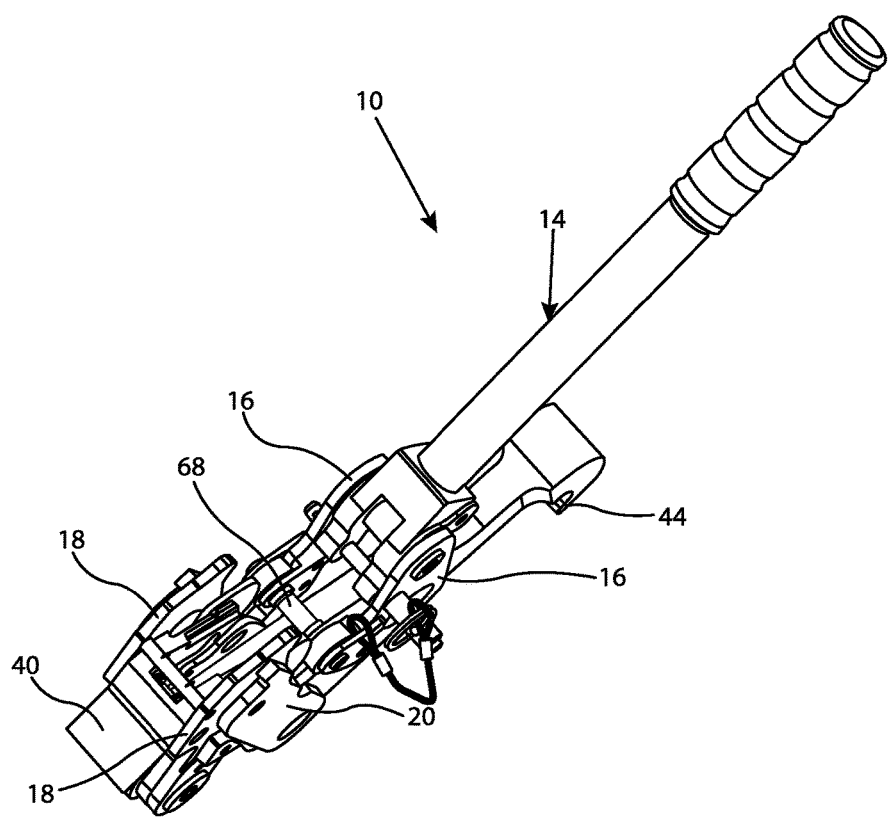
FIG. 5 is a side view of the embodiment of the disclosed latch mechanism shown in FIG. 1, with the handle shown in the open position and the latch shown in the closed position.
Figure 6:
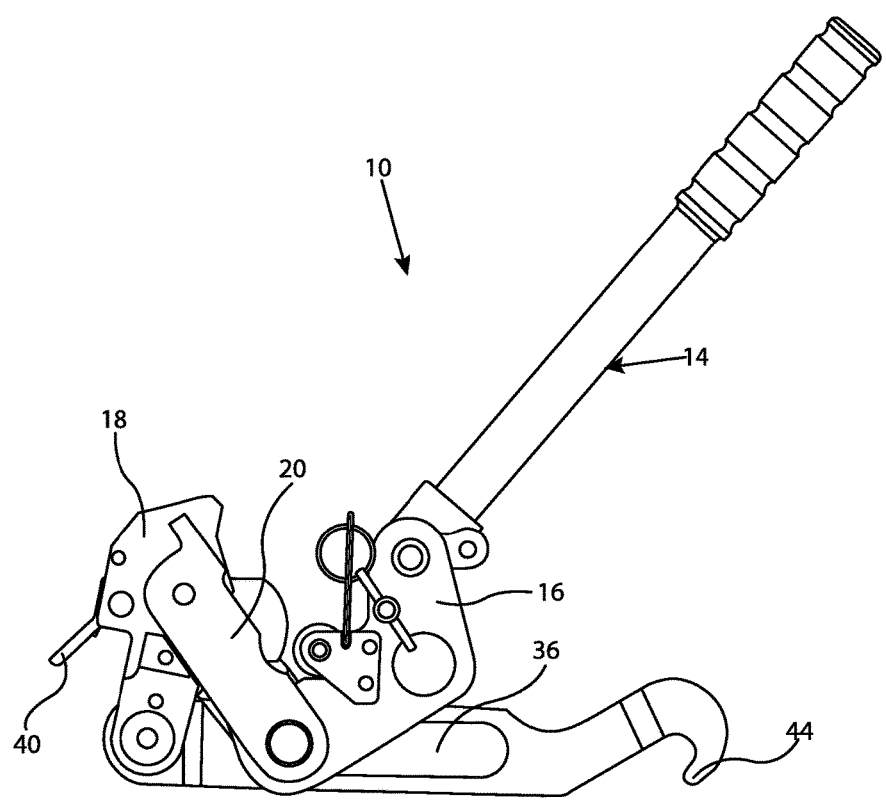
FIG. 6 is a side view of the embodiment of the disclosed latch mechanism shown in FIG. 1, with the handle and latch both shown in the open position.

FIGS. 5 through 7 show latch mechanism 10 in the open position. To move from the closed position shown in FIG. 4 to the open position shown in FIG. 5 through 7, a user of the latching mechanism rotates handle 14, which causes movement of first cam members 16 and a corresponding movement of cam links 66. Latch release pins 28 on cam links 66 contact toggle links 32, which carry the load of the latching mechanism and push the latching mechanism closed when a user is securing the latch. The impact of latch release pins 28 against toggle links 32 pushes toggle links 32 toward the open position and allow subsequent movement of the various components of the latch.

First cam members 16 and rear over-center links 20 are pivoted to form a roughly 90 degree angle, and mounting bushing 38 has moved along the length of longitudinal slot 36 toward the front of latch mechanism 10. Rear over-center links 20 and front over-center links 18 pivot in relation to one another at second over-center link pivot 54, moving out of axial alignment and closer to one another along their lengths.

To close latch mechanism 10, when in the position shown in FIG. 6, handle 14 is pulled toward the front of latch mechanism 10. This motion causes roller 30 to engage the outer edge of the heads 58 of second cam members 24 and to travel along the perimeter thereof. This action of handle 14 and roller 30 forces second cam members 24 toward latch body 22, pushing first over-center link pivot 38 toward the rear of latch body 22. Latch mechanism 10 continues to move in this fashion, with rollers 30 moving from the perimeter of second cam members 24 to the perimeter of front over-center links 18, further pushing the latching mechanism to a closed position until it reaches the configuration shown in FIG. 1, and lock 62 engages locking boss 60.

Unlocking latch mechanism 10 from the closed and locked position shown in FIG. 1 requires depression of latch trigger 40, which disengages lock 62 from locking boss 60. Handle 14 can then be pulled toward the rear of latch mechanism 10, causing movement of the various components of latch mechanism 10 in accordance with what is shown in the drawings, until latch mechanism 10 has reached the open position shown, for example, in FIG. 6.

One advantage of latch mechanism 10 is that the use of the dual over-center link structures and cam-driven action allowed for the desired long distance linear motion with limited rotation of the handle as required by prior latch mechanisms.

Figure 11:
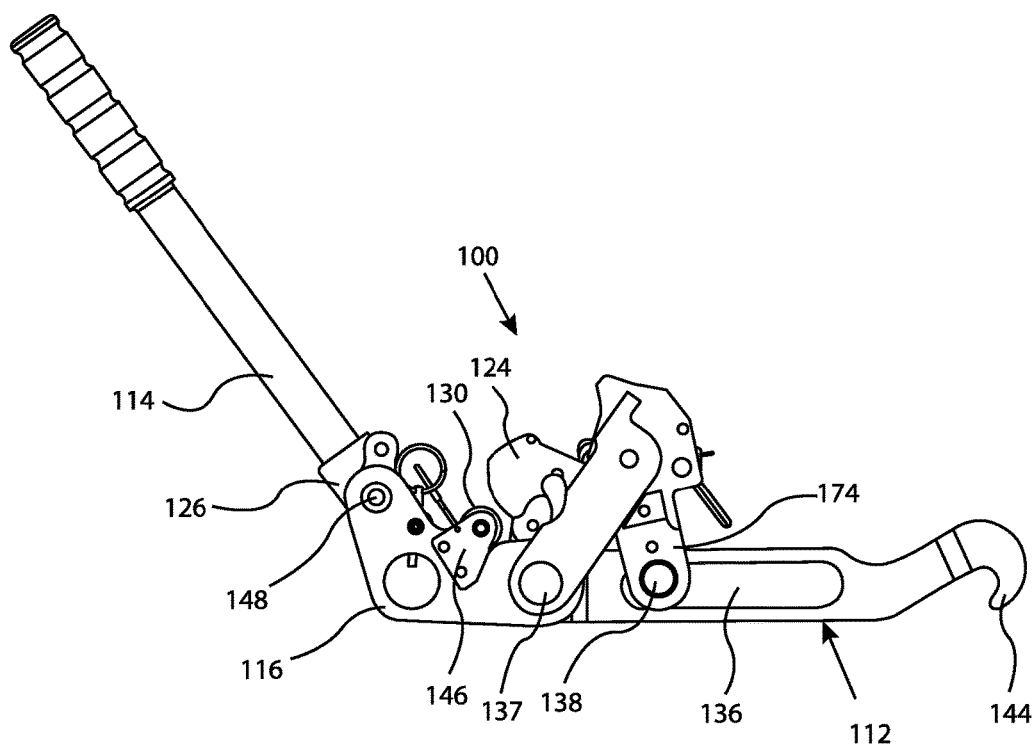
FIG. 11 is a side view of an alternate embodiment of the disclosed latching mechanism.

FIG. 11 depicts one alternate embodiment of the disclosed latching mechanism, with the latch shown in the open state. As can be seen, mounting bushing 138 extends through cam links 174 and over-center links 118 (shown in FIG. 12). Latch mechanism 100 includes various other components similar to those described with respect to latch mechanism 10, above. Broadly, latch mechanism 100 includes two components: a latch assembly 112 and a handle 114 used for manipulation of latch assembly 112. Latch assembly 112 includes a first cam members 116, a pair of rear over-center links 120, a pair of front over-center links 174, a pair of toggle links 132, a latch body 122, and a pair of second cam members 124. Handle 114 may include a clevis 126, which is pivotally attached to the pair of first cam members 116 by a handle rivet 148.

Figure 12:
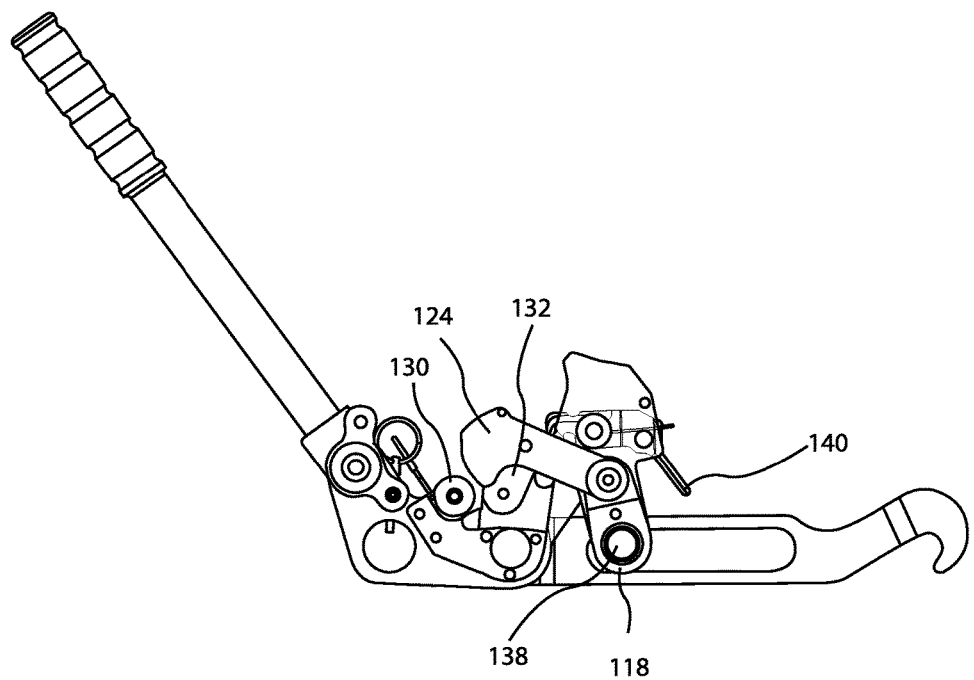
FIG. 12 is a side view of an alternate embodiment of the disclosed latching mechanism showing certain internal components thereof.

First cam members of latch mechanism 100 are attached to rear over-center links 120 by fastener 137. As with latch mechanism 10, first cam members 116 may be configured to form a pair of opposing support structures for a roller 130, such as roller support plates 146. FIG. 12 shows the attachment of cam links 118 to mounting bushing 138, as well as to second cam members 124. During operation of latch mechanism 100, mounting bushing 138 travels along longitudinal slot 136.

Figure 13:
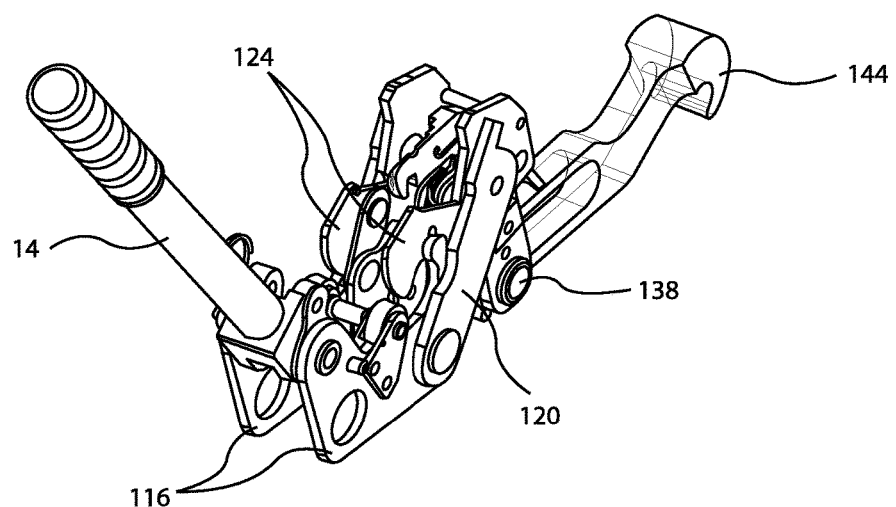
FIG. 13 is a front perspective view of an alternate embodiment of the disclosed latching mechanism.
Figure 14:
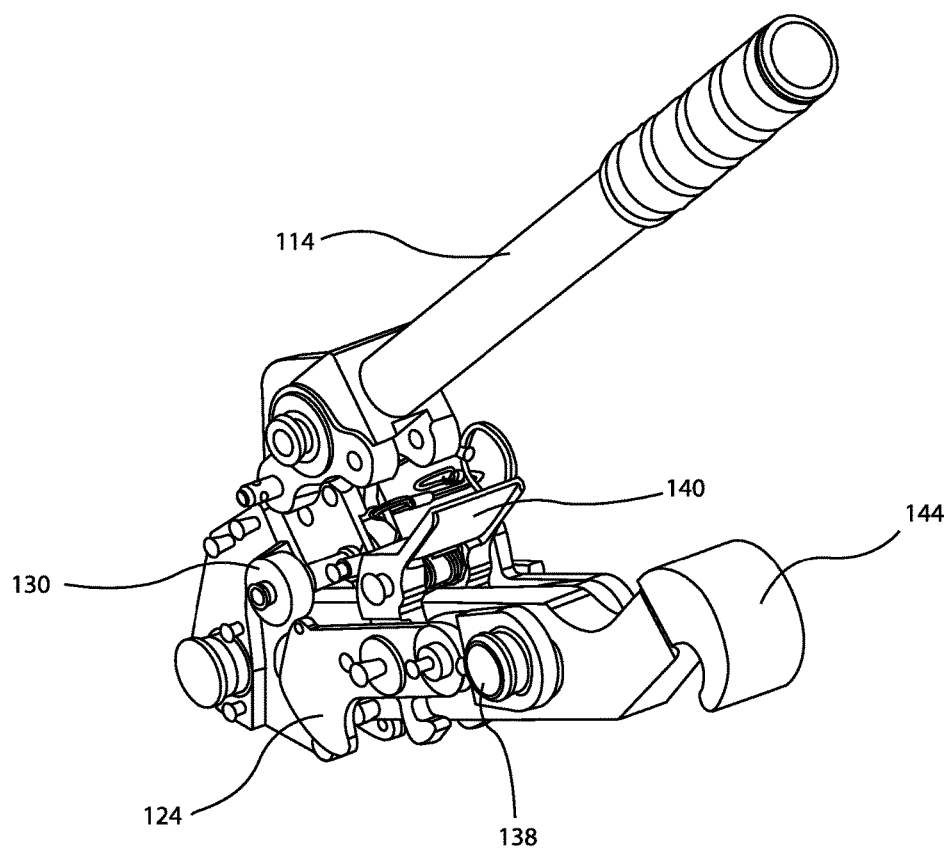
FIG. 14 is a rear perspective view of an alternate embodiment of the disclosed latching mechanism.
Figure 15:
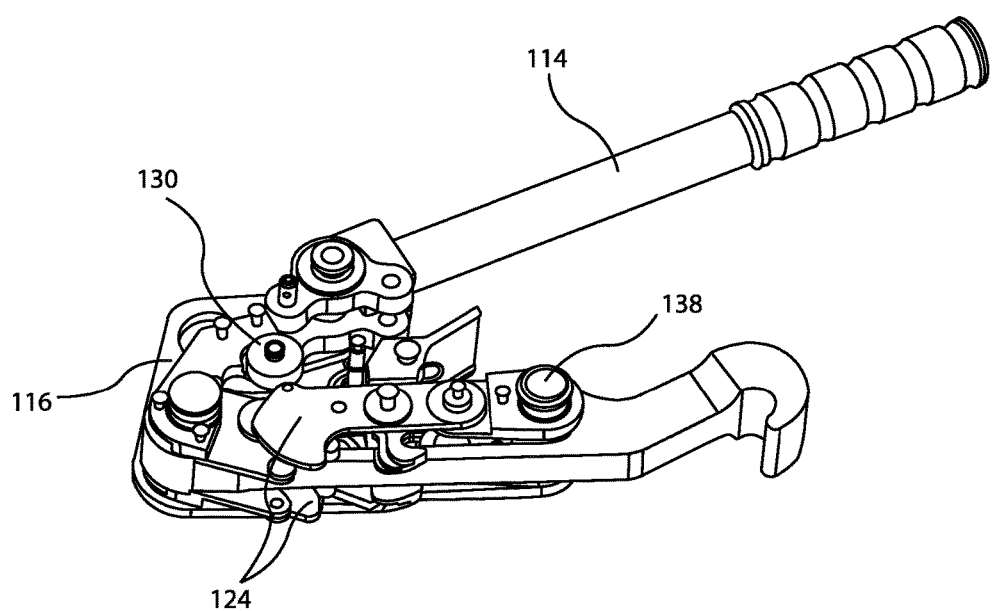
FIG. 15 is a side and bottom view of an alternate embodiment of the disclosed latching mechanism showing certain internal components thereof.
Figure 16:
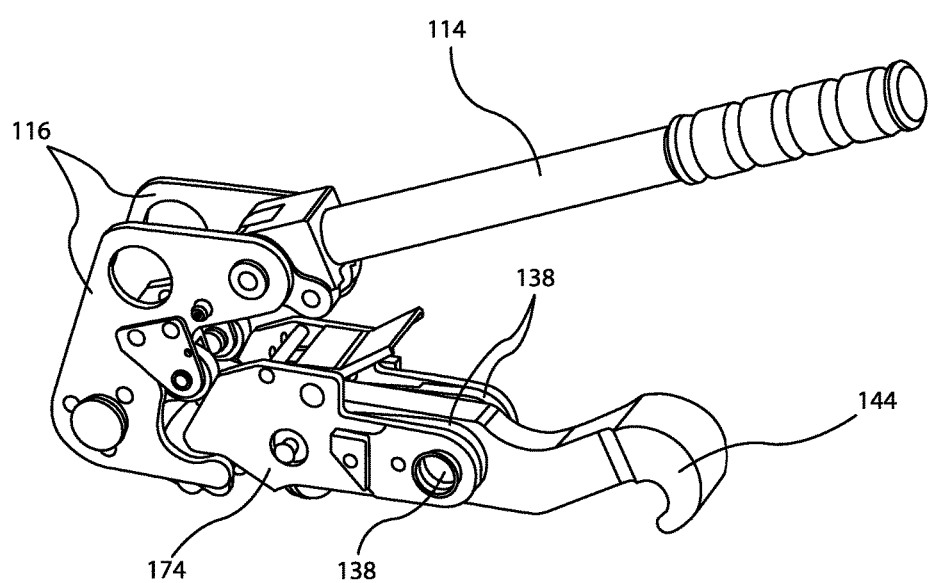
FIG. 16 is a side view of an alternate embodiment of the disclosed latching mechanism showing certain internal components thereof.

FIG. 13 depicts alternate latch embodiment 100 in the open position. FIGS. 14 through 16 depict alternate latch embodiment 100 in the closed position, with views of various interior components of latch mechanism 100 shown. As can be seen from the drawings, when handle 114 is engaged to move latch mechanism 100 from the open position to the closed position, the movement of handle 114 causes roller 130 to travel along the perimeter edge of second cam members 124, forcing second cam members 124 downward toward latch body 122 and causing mounting bushing 138 to travel along longitudinal slot 136. Latch mechanism 100 includes lock 162, which engages locking boss 160 when latch mechanism 100 is in the closed position. A latch trigger 140 is provided to disengage lock 162 from locking boss 160 so that latch mechanism 100 can be returned to the open position.

A variety of additional images are provided herewith showing the embodiments of the disclosed latching mechanism in various positions.

Latching mechanisms 10 and 100 are preferably fabricated from such materials as are accepted within the aircraft industry, including high-strength, light-weight alloy materials, and heat treated as required. The dimensions for each of the components will be determined based upon load requirements and spatial considerations. Fabricated components are to be inspected according to the appropriate inspection protocol per the application aircraft standards.

Having thus described the preferred embodiment of the invention, what is claimed as new and desired to be protected by Letters Patent includes the following:

1. A latch mechanism having a hook selectively moveable from a locked position to an unlocked position, and from the unlocked position to the locked position, the latch mechanism comprising:
    a latch body having a front end and a rear end and a longitudinal slot extending therethrough and along a portion of a length thereof, the hook positioned on the front end of the latch body;
    a handle;

a pair of first cam members having first and second ends, the handle pivotally attached to the first cam members on the first end thereof;

a pair of first over-center links having first and second ends, the first ends of the first over-center links pivotally attached to the first cam members on the second ends thereof;

a connecting structure pivotally attaching the second ends of the first cam members and the first ends of the first over-center links, the connecting structure extending through the longitudinal slot of the latch body;

a pair of second over-center links having first and second ends, the first ends of the second over-center links pivotally attached to the second ends of the first over-center links and the second ends of the second over-center links pivotally attached to the latch body, wherein movement of the handle causes a corresponding movement of the first cam members and first and second over-center links, and movement of the connecting structure along at least a portion of the length of the longitudinal slot, thereby moving the latch body so as to cause the hook to be moved from the locked position to the unlocked position and vice versa.

2. The latch mechanism according to claim 1, further comprising:

a pair of toggle links having first and second ends, the first end of the toggle links pivotally attached to the second ends of the first cam members;

a pair of second cam members having first and second ends, the first ends of the second cam members pivotally attached to the second ends of the toggle links;

a pair of cam links having first and second ends, the first ends of the cam links pivotally attached to the second ends of the second cam members and the second ends of the cam links pivotally attached to the latch body.

3. The device according to claim 1, further comprising:

a second cam member having first and second ends, the first end of the second cam member pivotally attached to the latch body and the second end of the second cam member defining a sloped perimeter; and a roller rotatably attached to the first pair of cam members, wherein when the latch mechanism is moved from the open position to the closed position, the roller travels along at least a portion of the perimeter of the second cam member, forcing the second cam member toward the latch body.

4. The device according to claim 3, further comprising:

a toggle link having a first end rotatably attached to the first cam member and a second end rotatably attached to the second cam member, the toggle link defining a perimeter edge; and a pin attached to at least one of the cams of the first pair of cam members at a position distal to the roller, wherein when the latch mechanism transitions from the open position to the closed position the pin travels along at least a portion of the toggle link, pushing the latch mechanism into the closed position.

5. The device according to claim 1, further comprising a locking mechanism for retaining the latch mechanism in the closed position.

6. The device according to claim 5, further comprising a release to disengage said locking mechanism to allow the latch mechanism to return to the open position from the closed position.

7. The latch mechanism according to claim 1, further comprising a clevis attached to the handle at a first end thereof, the clevis rotatably attached to each of the cams of the first pair of cam members and disposed between the two cams of the first pair of cam members.

* * * * *